F. R. SWARTWOUT.
OBSERVATION APPARATUS.
APPLICATION FILED MAR. 19, 1918.
1,333,192.
Patented Mar. 9, 1920.
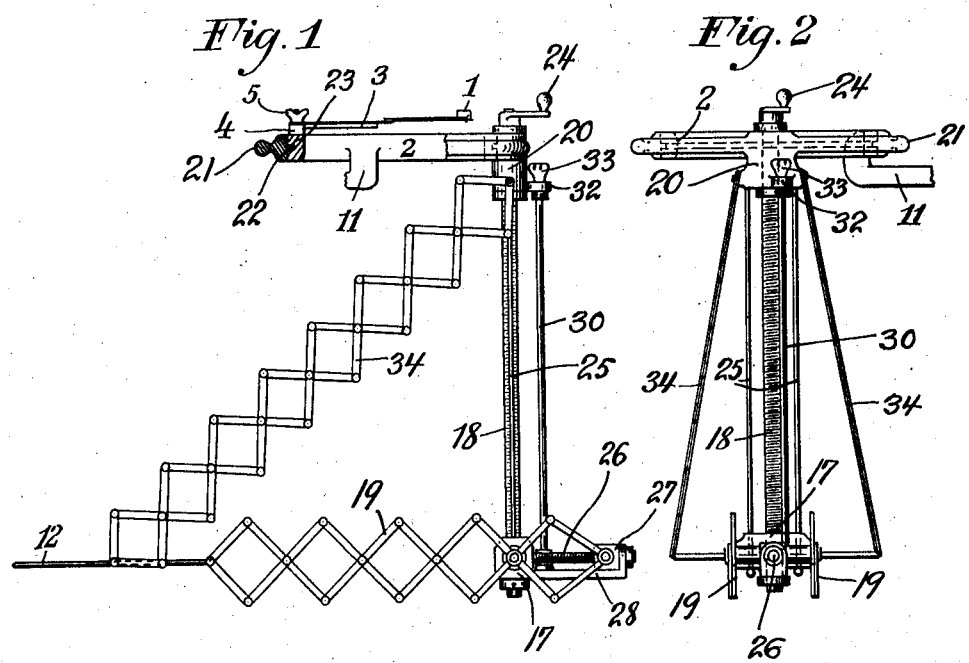
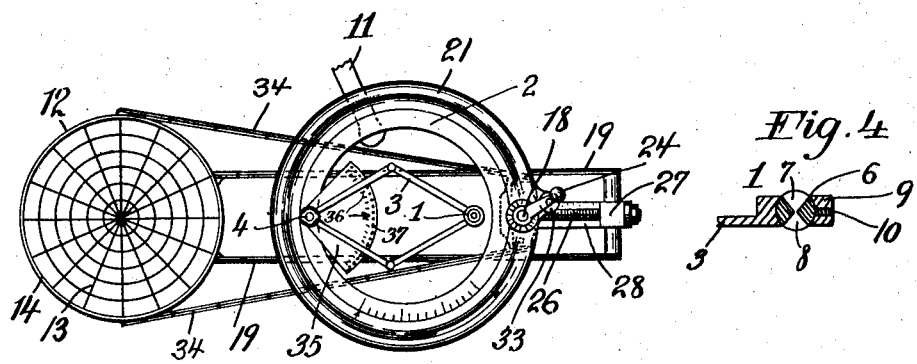
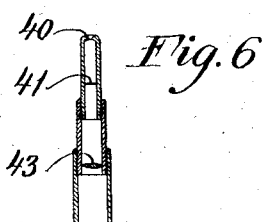
Inventor
Frank R. Swartwout,
By his Attorney
Henry J. Lucke

UNITED STATES PATENT OFFICE.

FRANK R. SWARTWOUT, OF SCARSDALE, NEW YORK.

OBSERVATION APPARATUS.

1,333,192.  Specification of Letters Patent.  Patented Mar. 9, 1920.

Application filed March 19, 1918. Serial No. 223,444.

*To all whom it may concern:*

Be it known that I, FRANK R. SWARTWOUT, a citizen of the United States of America, residing at Post Road, Scarsdale, Westchester county, New York, have invented a new and useful Improvement in Observation Apparatus, of which the following is a specification.

This invention relates to observation apparatus.

More particularly, the invention is directed to observation apparatus, preferably in the form of a unitary instrument, for spotting the location of hit of a shot relative to a target, particularly for use in aerial observation and to enable speedy reporting of the deviation of the hit from the target to correct the range of fire.

A further object of the invention is to enable plotting on a map or or other reference chart the locations of trenches, batteries, and other enemy objects as well as topographical objects, and the like.

Generally described, my invention comprises a movable sight element, and a movable reference element and means for effecting movement of one element relative to the other in substantially parallel planes. Instruments embodying my invention are preferably provided with scale markings on relatively movable parts for ascertaining the distance of the reference element from a fixed or other reference plane and for determining the horizontal elevation of the sight element from the plane of the reference element. A convenient form of reference element comprises a series of concentric wire "spiders", and a series of radial "spiders", whereby the face of the resulting dial will be divided into a predetermined number of sectors and sub-divisions thereof, capable of being designated by code characters for instant identification.

As one form of use for aerial observation, the observer sighting through the sighting element, moves the same or the reference element, or both, to sight the center or origin of the reference element in alinement with the target and at the instant of alinement ascertains the point on the reference element corresponding to the location of the hit of the shot, which point might be briefly called the "reference point". In such use, the sighting element or reference element, or both, are moved in substantially horizontal planes.

Mathematically considered, the observation of the distance and direction of a hit from the target, in absolute values are determined, for a given elevation of the observer from the vertical and horizontal distances between the sighting element and the "reference point" in the reference element at the instant of observation.

By reason of the parallel plane relation of the sighting element, reference element and, for example, the surface of the earth or sea, the computation of the discrepancy of a hit from a target resolves itself into a problem of triangulation or of conic sections; and the determination in absolute value is readable directly from the scale indications given by the instrument, for each known elevation of the observer. In the observation of the desired reference point, the respective parts of the reference element are visually projected on the earth's surface, affording an imaginary or visual enlarged reproduction of the constituent parts of the reference elements. Accordingly, upon calibrating the distances radially and arcually on the radii and arc wires of a reference element, as aforesaid, the distance in absolute value of the location of a hit from the target can be also computed, by allowance solely of the elevation of the observer above the surface of the earth or sea and the vertical elevation of the sighting element above the reference element.

The altitude of the observer at the instant of observation will be given by any suitable altitude indicating or measuring instrument. The accuracy of determination is favorably increased in the case of observation from an aeroplane by flying on a substantially even keel; *i. e.*, parallel to the earth's surface.

In such cases where the target does not lie substantially on the surface of the earth as when situated in a depression or on a hill or the like, suitable correction will be made for the deviation from the assumed plane.

The invention may comprise a lead or micrometer screw shaft and means for mounting the same to be positioned at all times in a vertical plane, as by a suitable gyroscopic mounting controlling means. The device is capable of reading the "spotting" of a shot when the screw shaft is not in a vertical plane provided the angle of the position of the screw shaft to the vertical at the instant of observation is determinable, as by mounting the screw shaft in fixed relation to a portion of the fuselage and correcting by the reading of an inclinometer, or equivalent device.

Further features and objects of the invention will be more fully understood from the following detail description and the accompanying drawings, in which Figure 1 is a side elevation of one embodiment of my invention; Fig. 2 is a rear view of the same; Fig. 3 is a top plan view; Fig. 4 a detail vertical section of the sight element; Fig. 5 a detail horizontal sectional view of an operating shaft; and Fig. 6 is a diagrammatic elevation of a modification employing a telescope.

The form of the invention set forth herein is directed particularly to observation apparatus for use in aerial work, and is adapted for locating, i. e., "spotting" the point of hit of a shot relatively to the target; and also for plotting the environment of enemy objects of a given locality.

Considering the point of sighting as the apex of an imaginary cone having its axis passing through said apex and the target, the base of the cone will be coincident with the surface of the earth, assuming the latter to be a plane. By the provision of a reference element, preferably a desired number of radially and concentrically arranged thin wires, disposed substantially in a common plane, upon moving said reference element in said common plane during the period of sighting to keep the center of the reference element in alinement with the target, the location of the hit of the shot on the earth's surface relatively to the target can be determined by reference to the corresponding point in the common plane of the reference element. For simplicity and speed in reading, the radial elements may be given predetermined code serial designations and the concentric wires predetermined code serial designations of a different character, thus affording an abbreviated designation for the particular segment and the particular fractional region thereof in which the point in the reference element corresponding to the location of the hit of the shot is located.

The point in the reference element enables the determination of the distance from a fixed or computable plane whereupon determining the distance of the sight element from said fixed or computable plane, the absolute distance between the point of hit of the shot from the target is readily determined for the specific elevation of the aeroplane above the earth's surface at the instant of observation.

Refinements in the desired quantity, for correcting the curvature of the earth's surface, variations in depression or elevation of the point of hit of the shot relatively to the target, as effected by the particular topography of the environment may be allowed for, as will be understood.

For practical purposes in the use of my observation apparatus, I provide a sight element, mounting means therefor permitting the same to be moved in substantially a plane, a reference element, means for moving said reference element in the common plane of its coördinated spaced elements of wire or other relatively thin material, preferably comprising lazy tongs for effecting rapid adjustment of the reference element in its common plane, a lead screw for moving said reference elements in a plane substantially perpendicular to the said common plane and calibrated scale markings for determining the distance of the center of the reference element from the lead screw, the distance of the plane of the reference element from the plane of movement of the sight element and such other markings for checking and rechecking the relative positions of the sight element and the reference element for ascertaining the desired data.

In the specific embodiment shown in the drawings, the sight element 1 is supported on the ring 2 and arranged to be movable substantially in a plane, as by means of the lazy tongs 3 pivotally supported on the ring 2 by means of the pivot stud 4. The set screw 5 is provided on the pivot stud 4 to position the sight element 1 at any desired point in its plane of adjustment.

The sight element, as shown on an enlarged scale in Fig. 4 is preferably of a universal type, as by disposing the sighting opening within the ball 6, conically cut away oppositely at 7, 8. The ball is mounted within the socket opening in the plate 9 and may be provided with the set screw 10 passing through an opening in the plate 9 for securing the sight element at the desired position.

The ring 2 is suitably supported by means of the bracket 11 as from the fuselage or from a shaft of a gyroscope-control device, for maintaining said ring 2 continuously in a substantially horizontal plane.

The reference element 12 is shown in the form of a "spider" comprising the radial wires 13 and the concentric circular wires 14. The wires 13, 14 are of relatively very thin material arranged to be disposed in substantially common plane.

The origin or center of the reference dial 12 is indicated at 16.

In the use for observation, means are provided for moving said reference dial 12 in its common plane and substantially parallel to the plane of movement of said sighting element 1. For such purpose, said reference dial 12 is carried by the nut 17 mounted on the lead 18 and supported by said nut 17 by means of one or more lazy tongs 19. The lazy tongs are shown as the means of support for the purpose of rapid positioning of the reference dial 12 at the desired point in its plane of movement, and a pair of such tongs 19 are employed to insure rigidity of mounting and minimizing errors due to wear of parts.

The lead screw 18 is supported within the collar 20 carried by the ring 21 mounted on the ring 2 for rotative positioning as by means of the circular tongue 22 extending within the annular groove 23. The lead screw 18 is rotated by means of the handle 24, mounted at one end of the screw 18 within convenient reach of the observer when sighting through the sight element 1.

The rods 25 fixed at their upper ends to the collar 20 project at their free ends through suitable openings within the nut 17 and serve to prevent the nut 17 from rotating when the screw 18 is rotated. Means are provided for operating the tongs 19 to position the reference element 12 in the desired location of its plane of movement. Such operating means may comprise the operating shaft 26 freely mounted at one end in a recess in the nut 17 and freely mounted at its other end within a recess in the bearing block 27, supported by the bracket 28 fixed to the nut 17. Said operating shaft 26 is threaded intermediate its ends, the threads of which mesh with the conical cut out worm gear 29 mounted on the operating shaft 30 by means of the key 31, permitting movement of said worm gear 29 longitudinally along the operating shaft 30. The lower end of shaft 30 is loosely positioned within a recess in the bracket 28 and the upper end of the shaft 30 is freely held within the recessed lug 32 fixed to the collar 20. The shaft 30 is operated by means of the knurled head 33, positioned adjacent the sight element 1.

The movable tongs 19 of the reference element 12 are controlled by the nut 27 in threaded relation with the threaded shaft 26, and connected with the tongs 19 as by means of toggle links.

Thus, upon rotating the handle 24 to vary the vertical position of the nut 17, and therewith the reference element 12, the bracket 28 will be moved accordingly and corresponding movement imparted to the operating shaft 26 and nut 24, while the worm gear 29 will be held in mesh with the operating shaft 26 and slide longitudinally of the control shaft 30. Also, upon rotation of the head 33, the worm 29 will be rotated to effect rotation of the shaft 26, to thereby move the reference element 12, either toward or away from the screw shaft 18, determined by the direction of rotation, but within the plane determined by the plane of the reference element 12.

The purpose of mounting the lead screw 18 on the ring 21 is merely for effecting rapid positioning of the reference element over a relatively wide area in the desired plane. Should it be desired not to provide such additional movement of adjustment for the reference element, said ring 21 may be integral with or held in fixed relation to the main support ring 2.

The elements of the reference element may be of the rectangular system, in lieu of the polar system described above, or of a combination of the two systems.

The direction of the hit from the target is read from the observation of the "reference point" on the reference element, corrected by the direction of the flight of the aeroplane at the instant of observation, as given by a compass.

The idle lazy tongs 34 serve to increase the rigidity of the supporting tongs 19 of the reference element.

Scale markings are applied to the several parts of the apparatus for determining the extent of relative displacement in the respective planes. The extent of displacement of the nut 17 along the lead screw 18 can be read from markings applied longitudinally of the lead screw 18, or by a revolution counter geared thereto for the whole number of turns and fractional turn readings from markings applied to the upper edge of collar 20. Scale marks are similarly applied to the contiguous edges of ring 2 and ring 21.

A quadrant 35 bearing scale markings 36 is preferably fixed to the stud 4 to indicate the position of the sight element 1 in its plane of movement. The markings 37 arranged concentric with the scale markings 36 may be employed to designate a desired position for a stop or an electrical contact adapted to indicate when the position of the sight element 1 is attained by the observer corresponding to a determined position of the reference element to give a signal or automatically release a bomb at the proper point in the air, commensurate with the altitude and direction of flight of the aeroplane, to traverse the trajectory passing through the target desired to be hit.

The telescope arrangement indicated in Fig. 6 embodies the principle of the aforesaid forms of my invention. The eye-piece 40 is arranged at one end of the telescope tube, in proper relation to the reference dial 41, as aforesaid. The objective lens or lenses 42, 43, are of suitable construction and arrangement to effect the visual images of the target and location of the hit within the contour of the reference dial 41.

Other uses of the observation apparatus embodying my invention apply to map-making of enemy or unsurveyed country, including plotting to scale of objects of interest thereon, as observed either from an aeroplane, balloon or any elevated stationary point, as from a mountain; such determination enables the computation of the width, height and other dimensions of objects at a known distance from the observer.

The apparatus may also be employed for determining the height of an object by observing at two different points at a known distance from each other. Similar use of the device can be applied for the determination of an unknown quantity, upon determination of the reference data of the reference point and the altitude of observation.

Whereas I have described my invention by reference to specific forms thereof, it will be understood that many changes may be made without departing from the invention, as defined by the appended claims.

I claim.

1. Observation apparatus, comprising a sight element, a reference element coacting therewith, said reference element extending transversely to and intersecting the axis of sight of said sight element, and means for bodily moving one of said elements relatively to the other in a plane parallel to a plane determined by said reference element.

2. Observation apparatus, comprising a sight element, means for mounting said sight element coacting with said sight element to move in a plane, a reference element, said reference element extending transversely to and intersecting the axis of sight of said sight element, and means for mounting said reference element to bodily move in a plane parallel to said first named plane.

3. Observation apparatus, comprising a sight element, a reference element coacting therewith, means for bodily displacing one of said elements relatively to the other in a predetermined plane and means for bodily displacing one of said elements relatively to the other in a plane transverse to said first-named plane.

4. Observation apparatus, comprising a sight element, a reference element coacting therewith, means for displacing one of said elements, relatively to the other in a predetermined plane and means for bodily displacing one of said elements relatively to the other in a plane perpendicular to said first-named plane.

5. Observation apparatus, comprising a sight element, a reference element coacting therewith comprising coördinated parts lying substantially in a common plane, said reference element extending transversely to and intersecting the axis of sight of said sight element, and means for bodily moving said reference element substantially in said plane.

6. Observation apparatus, comprising a sight element, means for moving said sight element, a reference element coacting with said sight element comprising spaced coordinate wires lying substantially in a common plane and means for bodily moving said reference element substantially in said plane.

7. Observation apparatus, comprising a sight element, means for moving said sight element substantially in a plane, a reference element coacting with said sight element comprising intersecting sets of wires lying substantially in a common plane and means for bodily moving said reference element substantially in said plane.

8. Observation apparatus, comprising a sight element, a reference element coacting with said sight element comprising coördinated intersecting sets of spaced parts of relatively thin material and lying substantially in a common plane and means for bodily moving said sight element in a plane substantially parallel to said common plane.

9. Observation apparatus, comprising a sight element, means for moving said sight element in a plane and for moving said sight element transversely to said plane, a reference element coacting with said sight element comprising coördinated intersecting sets of spaced elements of relatively thin material lying substantially in a common plane and means for bodily moving said reference element substantially in said plane.

10. Observation apparatus, comprising a sight element, a reference element coacting therewith comprising coördinated spaced parts of relatively thin material lying substantially in a common plane, means for moving said reference element substantially in said common plane and means for moving said sight element in a plane substantially parallel to said common plane.

11. Observation apparatus, comprising a sight element, a reference element coacting with said sight element comprising a plurality of intersecting coördinated sets of spaced elements of relatively thin material lying substantially in a common plane, means for bodily moving said reference element in said common plane and means for bodily moving said reference element in a plane substantially perpendicular to said common plane.

12. Observation apparatus, comprising a sight element, a reference element coacting therewith comprising coördinated spaced parts of relatively thin material lying substantially in a common plane, means for moving said reference element substantially in said common plane, means for moving said sight element in a plane substantially parallel to said common plane and means for moving said reference element in a plane substantially perpendicular to said common plane.

13. Observation apparatus, comprising a sight element, a reference element coacting therewith having a plurality of elements disposed in a common plane, said reference element extending in a plane substantially normal to and intersected by the axis of sight of said sight element, means for moving one of said elements in any desired plane parallel to said common plane and scale markings disposed on said elements for determining the extent of displacement of one of said elements relative to the other.

14. Observation apparatus, comprising a sight element, a reference element coacting with said sight element, supporting means for said reference element, said reference element extending transversely to and intersected by the axis of sight of said sight element, said supporting means being constructed to be disposed without the line of sight through said sight element and means carried by said supporting element for bodily moving said reference element relatively to said sight element.

15. Observation apparatus, comprising a sight element, a reference element coacting with said sight element, supporting means for said reference element, said reference element extending transversely to and intersected by the axis of sight of said sight element, said supporting means being constructed to be disposed without the line of sight through said sight element and means for bodily moving at will either or both said elements.

16. Observation apparatus, comprising a sight element, a reference element co-acting therewith, said reference element extending transversely to and intersecting the axis of sight of said sight element, means for bodily moving at will either of said elements relatively to the other and graduated means for indicating the extent of movement of said moving means.

17. Observation apparatus, comprising a sight element, a reference element co-acting therewith, said reference element extending transversely to and intersecting the axis of sight of said sight element, means for bodily moving at will either of said elements relative to the other in any plane parallel to a predetermined plane and graduated means for indicating the extent of movement of said moving means.

18. Observation apparatus, comprising a sight element, a reference element co-acting therewith, said reference element extending transversely to and intersecting the axis of sight of said sight element, means for bodily moving at will either of said elements relative to the other in a plane parallel to a predetermined plane and transversely to said predetermined plane and graduated means for indicating the correlative extents of movements of said moving means.

19. Observation apparatus, comprising a sight element, a reference element co-acting therewith, said reference element extending transversely to and intersecting the axis of sight of said sight element, means for bodily moving either of said elements relatively to the other in a plane parallel to a predetermined plane and in a plane perpendicular to said predetermined plane and graduated means for indicating the correlative extents of movements of said moving means.

In testimony whereof I have signed this specification this 16th day of March, 1918.

FRANK R. SWARTWOUT.